United States Patent
Loucks et al.

(10) Patent No.: US 11,629,616 B1
(45) Date of Patent: Apr. 18, 2023

(54) RADIALLY FLEXIBLE FLANGE JOINT FOR EXHAUST MANIFOLD

(71) Applicant: Power Systems Mfg., LLC, Juipter, FL (US)

(72) Inventors: Brian John Loucks, Sebastian, FL (US); Kevin Carpenter, Palm Beach Gardens, FL (US); Kevin Powell, Jupiter, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 0 days.

(21) Appl. No.: 17/674,268

(22) Filed: Feb. 17, 2022

(51) Int. Cl.
| | | |
|---|---|---|
| F01D 25/30 | (2006.01) | |
| F16L 27/11 | (2006.01) | |
| F16J 15/08 | (2006.01) | |

(52) U.S. Cl.
CPC .......... *F01D 25/30* (2013.01); *F16J 15/0887* (2013.01); *F16L 27/11* (2013.01); *F05D 2220/32* (2013.01); *F05D 2240/35* (2013.01); *F05D 2260/60* (2013.01)

(58) Field of Classification Search
CPC .... F01D 25/30; F01D 11/005; F05D 2220/32; F05D 2240/35; F05D 2260/60; F02B 37/18; F02B 47/08; F02M 26/05; F02M 26/06; F02M 26/07; F02M 26/15; F02M 26/23; F02M 26/35; F02M 26/42; Y02T 10/12; F01N 13/009; F01N 3/021; F01N 3/031; F01N 3/035; F01N 3/101; F01N 3/20; F01N 3/2053; F02K 1/805; F02K 1/80; B64D 33/04; F16L 27/11
See application file for complete search history.

(56) References Cited

U.S. PATENT DOCUMENTS

| | | | | |
|---|---|---|---|---|
| 4,044,971 | A * | 8/1977 | Pharris ................ | B64C 29/0025 416/61 |
| 6,076,835 | A * | 6/2000 | Ress .................... | F01D 11/005 277/637 |
| 6,675,584 | B1 * | 1/2004 | Hollis ................... | F01D 11/005 60/800 |
| 8,647,048 | B2 * | 2/2014 | Roberts .................. | F02K 1/805 415/214.1 |
| 9,488,110 | B2 * | 11/2016 | Chan ........................ | F02C 7/28 |
| 9,605,622 | B2 * | 3/2017 | Miller ...................... | F02C 6/04 |
| 10,830,103 | B2 * | 11/2020 | Mohammed ......... | F01D 11/005 |

(Continued)

*Primary Examiner* — Jesse S Bogue
(74) *Attorney, Agent, or Firm* — Hovey Williams LLP

(57) ABSTRACT

A radially flexible connection joint for a gas turbine engine includes an exhaust manifold flange operatively coupling an exhaust cylinder to an exhaust manifold of the gas turbine engine. The exhaust cylinder includes a cylindrical flange that extends radially outwardly from a rotation axis of the gas turbine. The cylindrical flange defines a downstream axial face. The exhaust manifold is positioned downstream from the exhaust cylinder. The exhaust manifold includes an upstream edge. The exhaust cylinder and the exhaust manifold are substantially coaxial with the rotation axis of the gas turbine. The exhaust manifold flange has a bellows portion that extends radially between the cylindrical flange of the exhaust cylinder and the upstream edge of the exhaust manifold. The bellows portion permits relative radial motion of the exhaust cylinder and the exhaust manifold.

18 Claims, 4 Drawing Sheets

(56) References Cited

U.S. PATENT DOCUMENTS

| | | | | |
|---|---|---|---|---|
| 2004/0031270 | A1* | 2/2004 | Sileo | F16J 15/0887 |
| | | | | 60/752 |
| 2007/0257442 | A1* | 11/2007 | Mast | F01D 25/30 |
| | | | | 277/391 |
| 2008/0267770 | A1* | 10/2008 | Webster | F16J 15/0887 |
| | | | | 415/173.1 |
| 2012/0104747 | A1* | 5/2012 | Ruberte Sanchez | F16L 27/11 |
| | | | | 285/299 |
| 2012/0306168 | A1* | 12/2012 | Giri | F01D 11/005 |
| | | | | 277/637 |
| 2016/0160666 | A1* | 6/2016 | Eastwood | F01D 9/041 |
| | | | | 415/208.1 |

\* cited by examiner

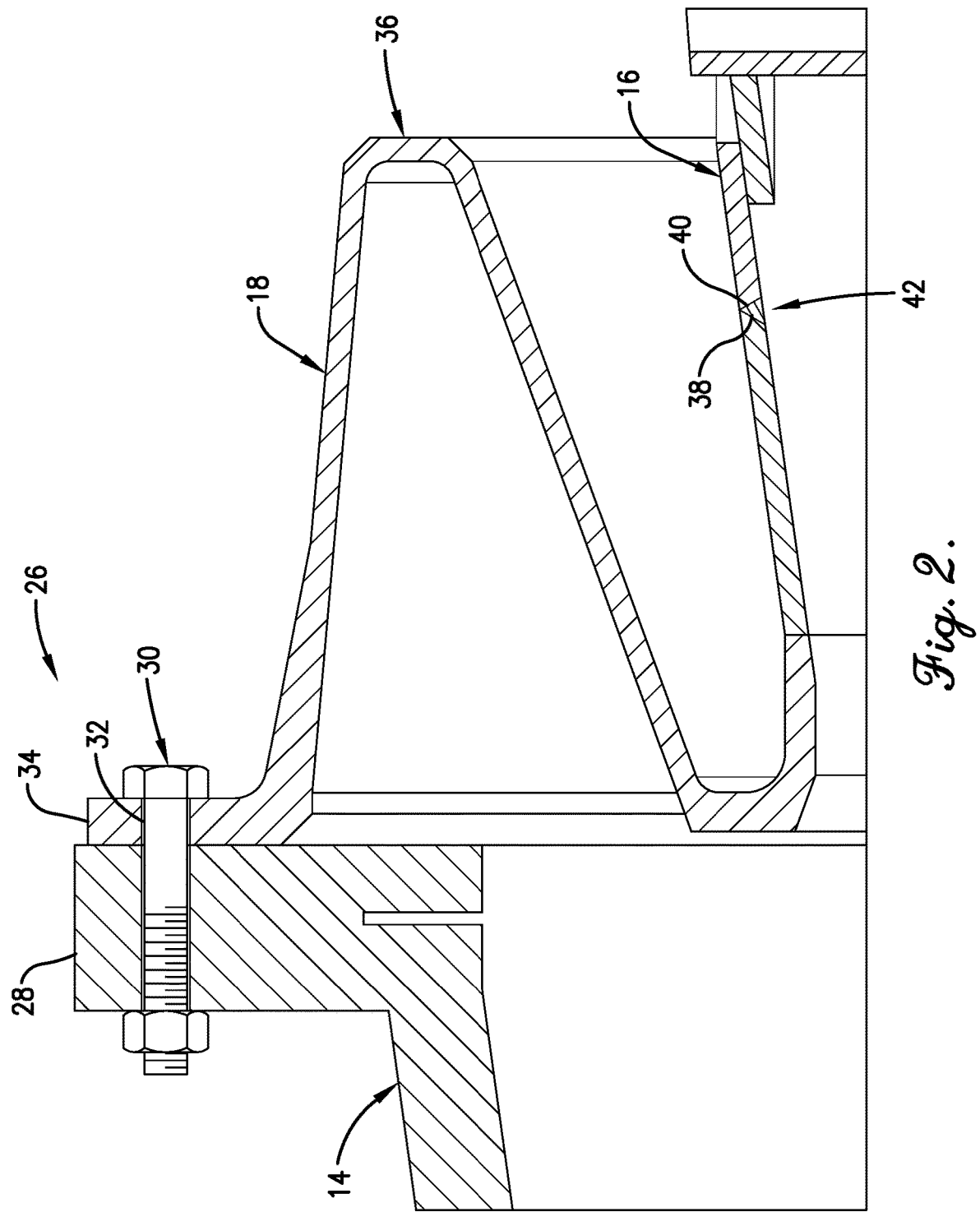

RADIALLY FLEXIBLE FLANGE JOINT FOR EXHAUST MANIFOLD

BACKGROUND

The present invention relates generally to gas turbine engines, and more particularly, to an exhaust manifold flange joint for use with gas turbine engines.

The exhaust portion of a gas turbine engine typically includes an exhaust cylinder and an exhaust manifold. During operation of the gas turbine engine, hot exhaust gases pass through the exhaust cylinder and the exhaust manifold. The hot exhaust gases cause the exhaust cylinder and the exhaust manifold to expand in the radial direction due to a change in temperature (thermal expansion). Notably, the exhaust cylinder and the exhaust manifold expand at different rates. In some gas turbine engines, the connection joint between the exhaust cylinder and the exhaust manifold is substantially rigid. The rigid connection joint reduces or prevents relative motion between the exhaust cylinder and the exhaust manifold. Consequently, excessive stresses are placed on the rigid connection joint, which can cause premature failure of the connection joint (e.g., cracks, fractures, breaks, etc.).

BRIEF DESCRIPTION

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, an exhaust manifold flange is provided. The exhaust manifold flange includes an annular mounting structure defining an upstream end of the exhaust manifold flange for attachment to an exhaust cylinder of a gas turbine engine. The exhaust manifold flange also includes a bellows portion coupled to the mounting structure. The bellows portion extends radially inwardly from the mounting structure and defines a downstream edge that is sized and shaped to attach to an upstream edge of an exhaust manifold of the gas turbine engine.

In another aspect, a radially flexible connection joint for a gas turbine engine is provided. The gas turbine engine defines a rotation axis. The connection joint includes an exhaust cylinder having a cylindrical flange that extends radially outwardly from the rotation axis. The cylindrical flange defines a downstream axial face. The exhaust connection joint also includes an exhaust manifold downstream from the exhaust cylinder. The exhaust manifold includes an upstream edge, wherein the exhaust cylinder and the exhaust manifold are substantially coaxial with the rotation axis. Furthermore, the connection joint includes an exhaust manifold flange operatively coupling the exhaust cylinder to the exhaust manifold. The exhaust manifold flange has a bellows portion extending radially between the cylindrical flange of the exhaust cylinder and the upstream edge of the exhaust manifold. Relative radial movement of the exhaust cylinder and the exhaust manifold is permitted via the bellows portion.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 is an enlarged view of a portion of FIG. 1, depicting a connection joint formed between an exhaust cylinder and an exhaust manifold by an exhaust manifold flange;

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

Broadly, aspects of the invention are directed to a connection joint formed between and joining together two or more gas turbine engine components having different rates of thermal expansion. Embodiments of the invention will be explained in connection with an exhaust cylinder and an exhaust manifold, but the detailed description is intended only as exemplary. Embodiments of the invention are shown in FIGS. 1-5, but the present invention is not limited to the illustrated structure or application.

Figure 1:
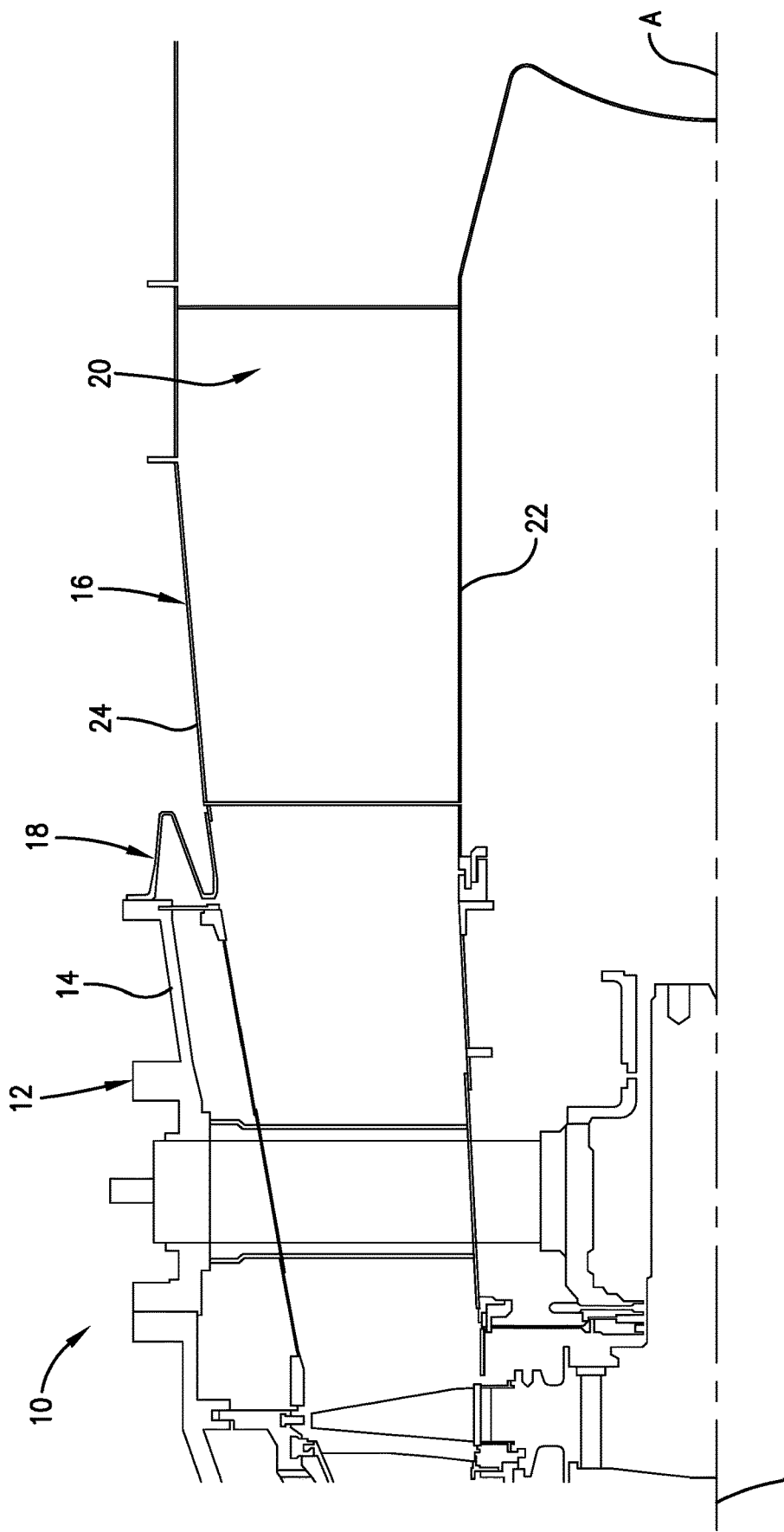
FIG. 1 is a side section of an exhaust portion of a gas turbine engine, in accordance with one or more embodiments of the present invention.

FIG. 1 is a side section of an exhaust portion 12 of a gas turbine engine 10, in accordance with one or more embodiments of the present invention. The exhaust portion 12 is located in the aft portion of a turbine section (not shown) of the gas turbine engine 10. The exhaust portion 12 includes an exhaust cylinder 14 and an exhaust manifold 16 that are substantially coaxial. Each of the exhaust portion 12 and the exhaust cylinder 14 extend generally radially outwardly from a rotation axis "A" of the gas turbine engine 10. The exhaust manifold 16 is positioned downstream from the exhaust cylinder 14. In particular, the exhaust manifold 16 is operatively coupled to an aft end of the exhaust cylinder 14 via a radially flexible annular exhaust manifold flange 18. The exhaust manifold 16 includes an exhaust gas flow path 20 defined, in part, by a radially inward wall 22 and a radially outward wall 24 of the exhaust manifold 16.

Figure 4:
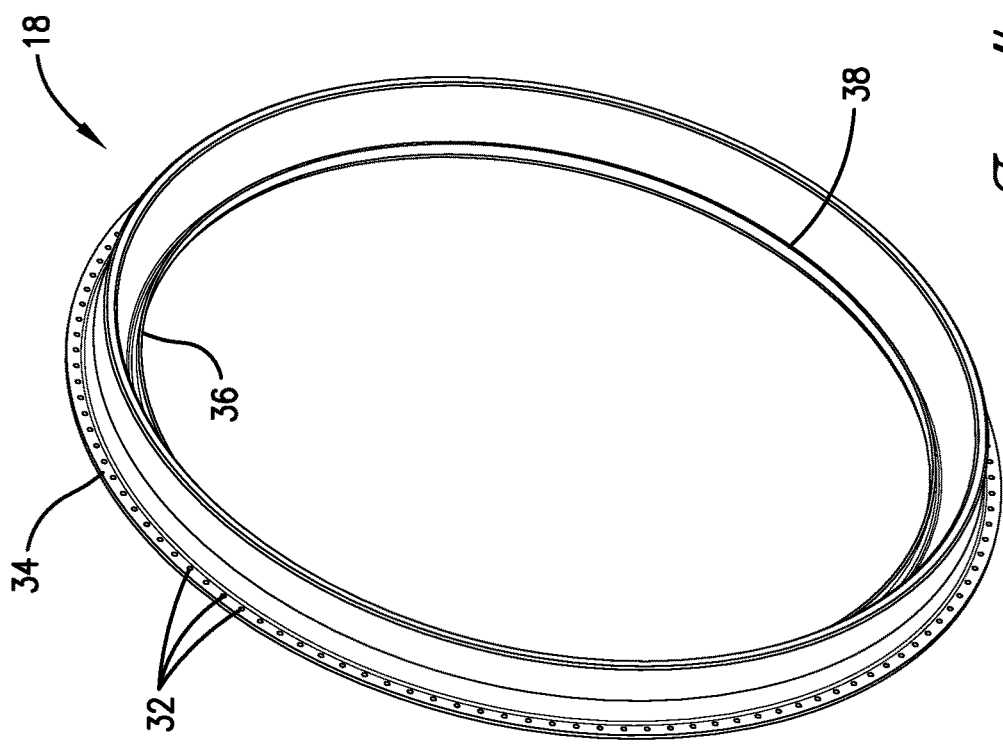
FIG. 4 is a rear perspective view of the exhaust manifold flange depicted in FIG. 2.
Figure 3:
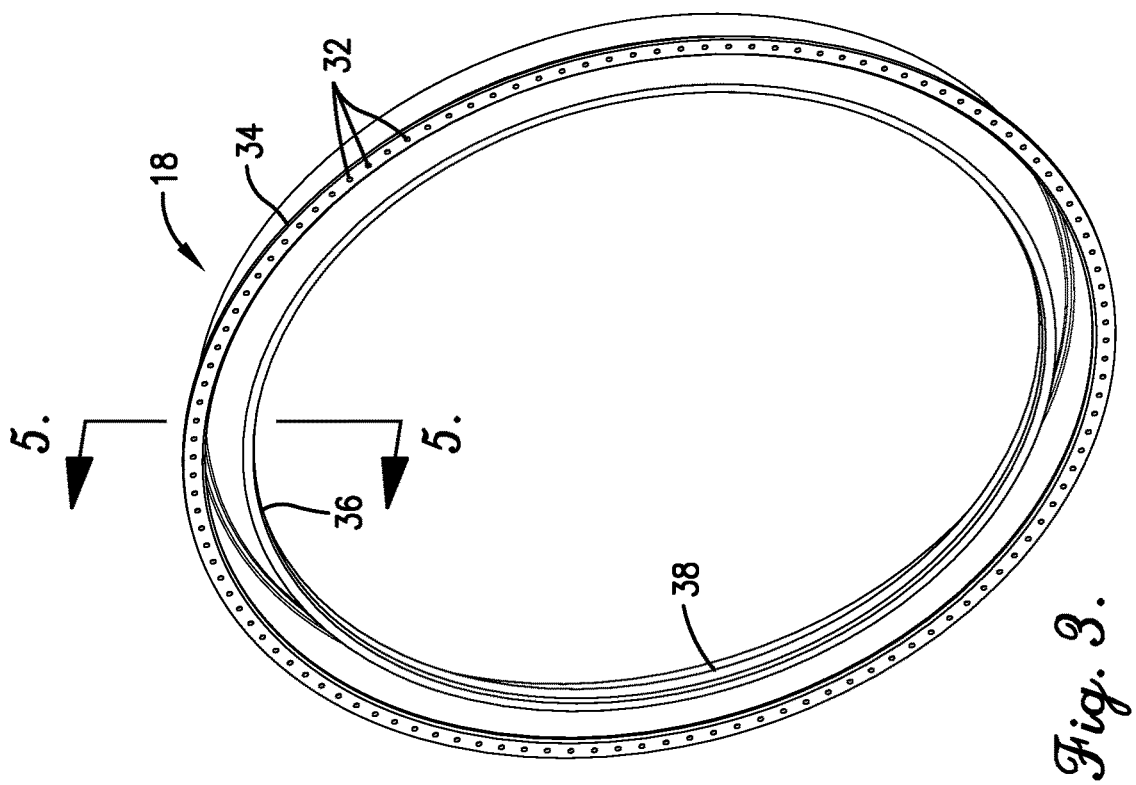
FIG. 3 is a front perspective view of the exhaust manifold flange depicted in FIG. 2.

FIG. 2 is an enlarged view of a portion of FIG. 1, depicting a radially flexible connection joint 26 that is formed by the exhaust manifold flange 18 joining together the exhaust cylinder 14 and the exhaust manifold 16. In the exemplary embodiment, the exhaust cylinder 14 includes a cylindrical flange 28 that extends radially outwardly from the rotation axis "A" (shown in FIG. 1). The exhaust manifold flange 18 is operatively coupled to the exhaust cylinder 14 in face-to-face contact at the radially flexible connection joint 26 via a plurality of fasteners 30. As described herein, the exhaust manifold flange 18 resists fatigue failure at the connection joint 26 by permitting relative radial motion of the exhaust cylinder 14 and the exhaust manifold 16, which may arise due to differing rates of thermal expansion, among other things. Furthermore, the exhaust manifold flange 18 provides for sealing of the connection joint 26, thereby preventing escape of hot exhaust gases. As depicted in FIGS. 3 and 4, the manifold flange 18 includes a plurality of apertures 32 defined therein for receiving the fasteners 30, which facilitate mating connection to the exhaust cylinder 14.

In the example embodiment, the exhaust manifold flange 18 includes an annular mounting structure 34, defining at an upstream end of the manifold flange 18. The mounting structure 34 is formed or fabricated from a unitary piece of material so as form a circumferentially continuous ring. Alternatively, the mounting structure 34 may include two or more segments coupled together to form a continuous ring. The mounting structure 34 includes an upstream axial face configured for face-to-face engagement with a downstream axial face of the cylindrical flange 28 of the exhaust cylinder 14. The mounting structure 34 includes the plurality of apertures 32 extending generally axially therethrough. In the example embodiment, the mounting structure 34 includes one hundred and twenty (12) apertures 32 equi-spaced about the circumference of the mounting structure 34. For example, each aperture 32 is spaced at an angle of about three degrees (3°) about the rotation axis "A" of the gas turbine engine 10 relative to each adjacent aperture 32. It is contemplated that the mounting structure 34 of the exhaust manifold flange 18 may have fewer or more apertures 32 in other aspects of the present invention. In the example embodiment, the apertures 32 are circular in shape, defining cylindrical apertures extending through the mounting structure 34. It is contemplated, however, that the apertures 32 can have any shape that enables the mounting structure 34 to function as described herein.

The exhaust manifold flange 18 also includes a radially flexible Z-shaped structure 36 (or bellows portion) that extends radially inwardly from the mounting structure 34 toward the rotation axis "A." The Z-shaped structure 36 (or bellows portion) defines a downstream edge 38 that is sized and shaped to attach to an upstream edge 40 of the exhaust manifold 16. In the example embodiment, the downstream edge 38 of the exhaust manifold flange 18 may be welded to the upstream edge 40 of the exhaust manifold 16, as indicated by the arrow 42.

Figure 5:
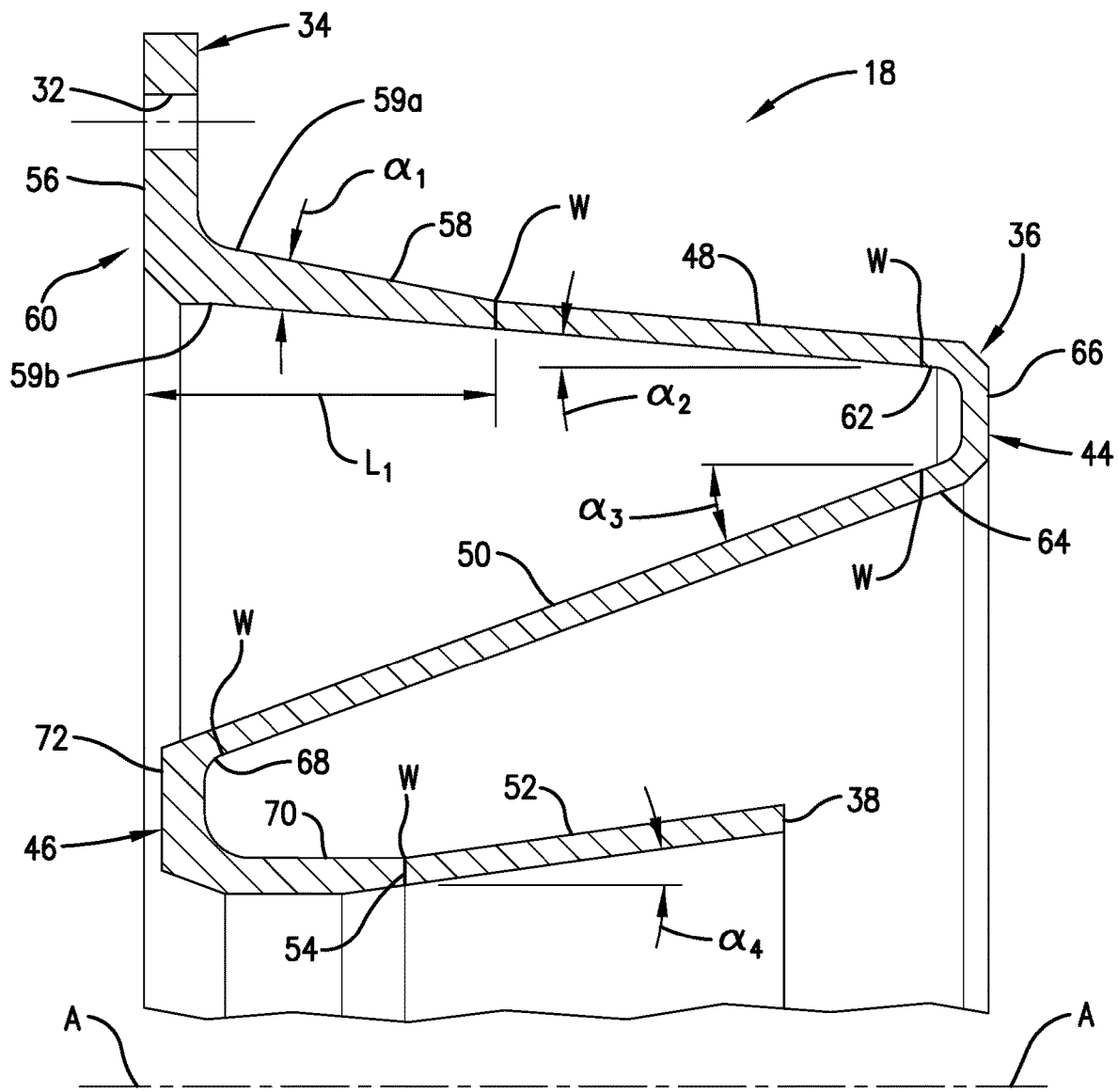
FIG. 5 is a side sectional view of a portion of the exhaust manifold flange depicted in FIG. 3, taken along line 5-5 in FIG. 3 in the direction of the arrows.

FIG. 3 is a front perspective view of the exhaust manifold flange 18, FIG. 4 is a rear perspective view of the exhaust manifold flange 18, and FIG. 5 is a side sectional view of a portion of the exhaust manifold flange 18, taken about line 5-5 shown in FIG. 3. In the example embodiment, the exhaust manifold flange 18 is formed as a circumferentially continuous ring. As depicted in FIG. 5, the exhaust manifold flange 18 may be fabricated from a plurality of components welded together to form the exhaust manifold flange 18. For example, in one embodiment, the exhaust manifold flange 18 may include the mounting structure 34, an intermediate ring 44, and an inner ring 46. Each of the mounting structure 34, the intermediate ring 44, and the inner ring 46 may be forged, for example, from a metal and machined to their respective final dimensions. The mounting structure 34 may be coupled to the intermediate ring 44 via sheet stock material formed in an annular cone-shaped ring 48. Similarly, the intermediate ring 44 may be coupled to the inner ring 46 via sheet stock material formed in an annular cone-shaped ring 50. A sheet stock material formed in an annular cone-shaped ring 52 may be coupled to a downstream edge 54 of the inner ring 46. Each of the components described above may be coupled to each other, for example, via weld joints "W." Thus, as depicted in FIG. 5, the Z-shaped structure 36 (or bellows portion) may include the annular cone-shaped ring 48, the intermediate ring 44, the annular cone-shaped ring 50, the inner ring 46, and the annular cone-shaped ring 52.

It is contemplated that in some embodiments, the exhaust manifold flange 18 may be formed as a unitary component. For example, the exhaust manifold flange 18 may be fabricated from a single piece of material using one or more of a cold forming and hot forming process. In some examples, the exhaust manifold flange 18 may be formed (e.g., stamped, stretched formed, etc.) from a flat sheet material.

In example embodiments, the exhaust manifold flange 18 may be fabricated from a metal, such as, and without limitation, steel, titanium, aluminum, or a superalloy. Alternatively, the exhaust manifold flange 18 may be fabricated from any material that enables the exhaust manifold flange 18 to function as described herein. More particularly, the exhaust manifold flange 18 is constructed to provide a significant temperature gradient thereacross. The exhaust manifold flange 18 is constructed, in the exemplary embodiment, from a steel alloy, such as a stainless steel.

Referring back to FIG. 5, the mounting structure 34 of the exhaust manifold flange 18 includes a radial portion 56, which defines the upstream side 60 of the exhaust manifold flange 18. The mounting structure 34 also includes an axial portion 58 extending an axial distance L1. As depicted in FIG. 5, the axial portion 58 has a taper angle α1 along the axial distance L1. The taper angle α1 is between a radially outer face 59a and a radially inner face 59b of the axial portion 58 in a downstream direction away from the radial portion 56 and is in the range between and including two degrees (2°) and ten degrees (10°), and more preferably between five degrees (5°) and seven degrees (7°). In one embodiment, the taper angle α1 is six degrees (6°) with a tolerance of about plus or minus one half degree (0.5°). The taper angle α1 of the axial portion 58 facilitates reducing fatigue failure of the manifold flange 18, particularly at the manifold flange portion 34, as described herein.

As further depicted in FIG. 5, the axial portion 58 extends axially from the radial portion 56 at an angle α2, relative to the rotation axis "A" (e.g., horizontal), in the range between and including two degrees (2°) and ten degrees (10°). In one embodiment, the angle α2 is five degrees (5°) with a tolerance of about plus or minus one half degree (0.5°). The annular cone-shaped ring 48 extends axially from the axial portion 58 at substantially the same angle, angle α2.

The intermediate ring 44, as described above, may be forged from a metal and machined to its final form. In the example embodiment, the intermediate ring 44 is generally C-shaped, including two (2) generally axially extending legs 62, 64, and a substantially vertically extending wall portion 66. The upper leg 62 extends in an upstream direction at an angle substantially the same as angle α2 such that the upper leg 62 can be coupled a downstream edge of the annular cone-shaped ring 48. The lower leg 64 extends axially from the wall portion 66 at an angle α3, relative to the rotation axis "A" (e.g., horizontal), in the range between and including ten degrees (10°) and twenty-five degrees (25°). In one embodiment, the angle α3 is twenty degrees (20°) with a tolerance of about plus or minus one half degree (0.5°). The annular cone-shaped ring 50 is coupled to the lower leg 64 and extends axially from the intermediate ring 44 at the same angle α3.

The inner ring 46, as described above, may be forged from a metal and machined to its final form. In the example embodiment, the inner ring 46 is generally C-shaped, including two (2) generally axially extending legs 68, 70, and a substantially vertically extending wall portion 72. The upper leg 68 extends in a downstream direction at an angle substantially the same as angle α3 such that the upper leg 68 can be coupled an upstream edge of the annular cone-shaped ring 50. The lower leg 70 extends axially from the wall portion 72 in a direction substantially parallel to the rotation axis "A" (e.g., horizontal direction). The annular cone-shaped ring 52 is coupled to and extends axially from the lower leg 70 of the inner ring 46 at an angle α4, relative to the rotation axis "A" (e.g., horizontal), in the range between and including four degrees (4°) and six degrees (6°). In one embodiment, the angle α4 is five degrees (5°) with a tolerance of about plus or minus one half degree (0.5°).

In the exemplary embodiment, the exhaust manifold flange 18 is configured to provide radial flexibility to account for a difference in thermal growth between the exhaust cylinder 14 and the exhaust manifold 16 at the radially flexible connection joint 26 that is encountered during transient operation. Thus, the radially flexible Z-shaped structure 36 (or bellows portion) permits radial and circumferential growth of the exhaust manifold 16, such as may occur during thermal transitions resulting in a thermal expansion and/or contraction of the exhaust manifold 16 relative to the exhaust cylinder 14 during operation of the gas turbine engine 10.

For example, during operation of the gas turbine engine 10, hot exhaust gas is channeled serially through the exhaust cylinder 14 and the exhaust manifold 16, for example, via the exhaust gas flow path 20. The intense heat of the exhaust gas causes the exhaust cylinder 14 and the exhaust manifold 16 to thermally expand, for example, in the radial direction. The exhaust manifold 16, due in part to its direct exposure to the exhaust gas, is subjected to an increased rate of heat absorption relative to the cylindrical flange 28 of the exhaust cylinder 14, Thus, the exhaust manifold 16 may expand at a higher rate than an expansion rate of the exhaust cylinder 14.

As the thermal expansion of the exhaust manifold 16 occurs, the exhaust manifold flange 18 allows the exhaust manifold 16 to expand radially while substantially restricting other movement of the exhaust manifold 16. The thermal expansion causes bending of the exhaust manifold flange 18, and more particularly, the axial portion 58 of the mounting structure 34 relative to the radial portion 56. The taper angle α1 facilitates increasing the life cycle of the manifold flange 18 and thus the connection joint 26 by distributing the bending stress along the length L1 of the axial portion 58. This distribution of stress and resulting life cycle increase reduces maintenance costs of the gas turbine engine 10.

The differential rate of radial expansion of the exhaust cylinder 14 and the exhaust manifold 16 may be accommodated by Z-shaped structure 36 (or bellows portion) of the exhaust manifold flange 18. For instance, as the exhaust manifold 16 expands radially outward, the radial portion 56 of the mounting structure 34 remains substantially fixed to the cylindrical flange 28 of the exhaust cylinder 14. However, the Z-shaped structure 36 can flex relative to the radial portion 56, which extends radially from the exhaust manifold 16. Little or no bending loads are transferred to the exhaust cylinder 14 and/or the exhaust manifold 16, but rather are imparted to the axial portion 58 of the mounting structure 34. As discussed above, the taper angle α1 in configured to accommodate such bending loads.

Advantages of the exhaust manifold flange 18 described above include protecting and maintaining the integrity of the connection joint 26 between the exhaust cylinder 14 and the exhaust manifold 16. As a result, there can be a reduction in the occurrence of component failure, attendant downtime, and maintenance costs. In addition, the exhaust manifold flange 18 facilitates the location of the exhaust manifold 16 during assembly. Further, the exhaust manifold flange 18 can be fabricated at a relatively low cost and can be easily replaced if it requires repair due to wear or abusive operation. In addition, the exhaust manifold flange 18 described herein provides sealing at the connection joint 26 between the exhaust cylinder 14 and the exhaust manifold 16 to prevent escape of hot exhaust gasses therefrom.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

In the following specification and claim, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claim, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal or rotational axis of the motor assembly. The terms "radial" and "radially" refer to directions and orientations extending substantially perpendicular to the rotation axis. The terms "tangent" and "tangential" refer to the directions and orientations extending substantially perpendicular to a radial direction of the motor assembly. In addition, as used herein, the terms "circumferential" and "circumferentially" refer to directions and orientations extending in the general direction around the rotation axis of the motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

What is claimed is:

1. An exhaust manifold flange comprising:
    an annular mounting structure having a radial portion that defines an upstream end of the exhaust manifold flange and is sized and shaped for attachment to an exhaust cylinder of a gas turbine engine and an axial portion extending a predetermined axial distance from the radial portion; and
    a bellows portion coupled to the mounting structure, the bellows portion extending radially inwardly from the axial portion of the mounting structure and defining a downstream edge that is sized and shaped to attach to an upstream edge of an exhaust manifold of the gas turbine engine, said axial portion being formed with a taper angle between a radially outer face and a radially inner face of the axial portion in a downstream direction away from radial portion and configured to reduce fatigue failure of the manifold flange portion.

2. The exhaust manifold flange in accordance with claim 1, said mounting structure being formed as a circumferentially continuous ring from a unitary piece of material.

3. The exhaust manifold flange in accordance with claim 1, said mounting structure comprising two or more segments coupled together to form a circumferentially continuous ring.

4. The exhaust manifold flange in accordance with claim 1, said bellows portion comprising:
    a first annular cone-shaped ring defining a first upstream edge and a first downstream edge, the first upstream edge being coupled to the mounting structure;
    an intermediate ring coupled to the first downstream edge of the first annular cone-shaped ring;
    a second annular cone-shaped ring defining a second upstream edge and a second downstream edge, the second downstream edge being coupled to the intermediate ring;
    an inner ring coupled to the second upstream edge of the second annular cone-shaped ring; and
    a third annular cone-shaped ring defining a third upstream edge and a third downstream edge, the third upstream edge being coupled to the inner ring.

5. The exhaust manifold flange in accordance with claim 4,
    said intermediate ring being generally C-shaped in section and comprising a first upper leg, a first lower leg, and a wall portion extending radially between the first upper and lower legs,
    said first upper leg being coupled to the first downstream edge of the first annular cone-shaped ring, and
    said first lower leg being coupled the second downstream edge of the second annular cone-shaped ring.

6. The exhaust manifold flange in accordance with claim 4,
    said inner ring being generally C-shaped in section and comprising a second upper leg, a second lower leg, and a second wall portion extending radially between the second upper and lower legs,
    said second upper leg being coupled to the second upstream edge of the second annular cone-shaped ring, and
    said second lower leg being coupled the third upstream edge of the third annular cone-shaped ring.

7. The exhaust manifold flange in accordance with claim 1, said taper angle being in a range between and including two degrees (2°) and ten degrees (10°).

8. The exhaust manifold flange in accordance with claim 1, said mounting structure comprising a plurality of axially extending apertures defined through the radial portion.

9. The exhaust manifold flange in accordance with claim 8, said plurality of axially extending apertures allowing mating connection to an exhaust cylinder.

10. A radially flexible connection joint for a gas turbine engine, the gas turbine engine defining a rotation axis, said connection joint comprising:
an exhaust cylinder comprising a cylindrical flange that extends radially outwardly from the rotation axis, the cylindrical flange defining a downstream axial face;
an exhaust manifold downstream from the exhaust cylinder, the exhaust manifold comprising an upstream edge, wherein the exhaust cylinder and the exhaust manifold are substantially coaxial with the rotation axis; and
an exhaust manifold flange operatively coupling the exhaust cylinder to the exhaust manifold, the exhaust manifold flange comprising a bellows portion extending radially between the cylindrical flange of the exhaust cylinder and the upstream edge of the exhaust manifold, whereby relative radial movement of the exhaust cylinder and the exhaust manifold is permitted, said exhaust manifold flange further comprising an annular mounting structure coupled to the bellows portion, said mounting structure comprising a radial portion that defines the upstream axial face, and an axial portion extending a predetermined axial distance from the radial portion, and said axial portion being formed with a taper angle between a radially outer face and a radially inner face of the axial portion in a downstream direction away from radial portion and configured to reduce fatigue failure of the exhaust manifold flange.

11. The radially flexible exhaust manifold flange joint in accordance with claim 10,
said mounting structure defining an upstream axial face, and
wherein the upstream axial face of the exhaust manifold flange engages the downstream axial face of the exhaust cylinder in face-to-face contact.

12. The radially flexible exhaust manifold flange joint in accordance with claim 11, said bellows portion comprising:
a first annular cone-shaped ring defining a first upstream edge and a first downstream edge, the first upstream edge being coupled to the mounting structure;
an intermediate ring coupled to the first downstream edge of the first annular cone-shaped ring;
a second annular cone-shaped ring defining a second upstream edge and a second downstream edge, the second downstream edge being coupled to the intermediate ring;
an inner ring coupled to the second upstream edge of the second annular cone-shaped ring; and
a third annular cone-shaped ring defining a third upstream edge and a third downstream edge, the third upstream edge being coupled to the inner ring.

13. The radially flexible exhaust manifold flange joint in accordance with claim 12,
said intermediate ring being generally C-shaped in section and comprising a first upper leg, a first lower leg, and a wall portion extending radially between the first upper and lower legs,
said first upper leg being coupled to the first downstream edge of the first annular cone-shaped ring, and
said first lower leg being coupled the second downstream edge of the second annular cone-shaped ring.

14. The radially flexible exhaust manifold flange joint in accordance with claim 12,
said inner ring being generally C-shaped in section and comprising a second upper leg, a second lower leg, and a second wall portion extending radially between the second upper and lower legs,
said second upper leg being coupled to the second upstream edge of the second annular cone-shaped ring, and
said second lower leg being coupled the third upstream edge of the third annular cone-shaped ring.

15. The radially flexible exhaust manifold flange joint in accordance with claim 12, said first annular cone-shaped ring extending axially downstream and radially inwardly toward the rotation axis at an inward first angle taken from a position parallel to the rotation axis, the first angle being in a range between and including two degrees (2°) and ten degrees (10°).

16. The radially flexible exhaust manifold flange joint in accordance with claim 12, said second annular cone-shaped ring extending axially upstream and radially inwardly toward the rotation axis at an inward second angle taken from a position parallel to the rotation axis, the second angle being in a range between and including ten degrees (10°) and twenty-five degrees (25°).

17. The radially flexible exhaust manifold flange joint in accordance with claim 12, said third annular cone-shaped ring extending axially downstream and radially outwardly away from the rotation axis at an outward third angle taken from a position parallel to the rotation axis, the third angle being in a range between and including two degrees (2°) and ten degrees (10°).

18. The radially flexible exhaust manifold flange joint in accordance with claim 10, said taper angle being in a range between and including two degrees (2°) and ten degrees (10°).

* * * * *